United States Patent [19]

Bryhn et al.

[11] 4,425,165

[45] Jan. 10, 1984

[54] STABILIZING CLAY SOIL WITH HYDROXY-ALUMINUM AND CELLULOSIC POLYMERS

[75] Inventors: Odd R. Bryhn; Tor Loken, both of Oslo, Norway

[73] Assignee: Chevron Research Company, San Francisco, Calif.

[21] Appl. No.: 438,234

[22] Filed: Nov. 1, 1982

[51] Int. Cl.³ .......................... C08K 3/24; C08L 1/26; C09K 3/00; C04B 1/47
[52] U.S. Cl. ............................... 106/193 R; 106/194; 106/198; 106/287.17; 106/900; 166/292; 405/263; 405/264; 501/147
[58] Field of Search ................... 106/900, 287.17, 193, 106/194, 198; 166/294, 303; 501/147; 405/263, 264

[56] References Cited

U.S. PATENT DOCUMENTS

| 4,360,599 | 11/1982 | Loken | 501/147 |
| 4,372,786 | 2/1983 | Reed et al. | 106/900 |
| 4,377,419 | 3/1983 | Reed | 106/900 |
| 4,380,408 | 4/1983 | Loken | 405/263 |

FOREIGN PATENT DOCUMENTS 56-143288 11/1981 Japan ..................................... 106/900

Primary Examiner—Theodore Morris
Attorney, Agent, or Firm—Edward J. Keeling; D. A. Newell

[57] ABSTRACT

The present invention provides a method of stabilizing clay soil having a high water content by mixing an effective amount of hydroxy-aluminum and cellulosic polymer with the clay soil to deactivate water and thereby assist in preventing such water from fluidizing the clay soil.

7 Claims, 5 Drawing Figures

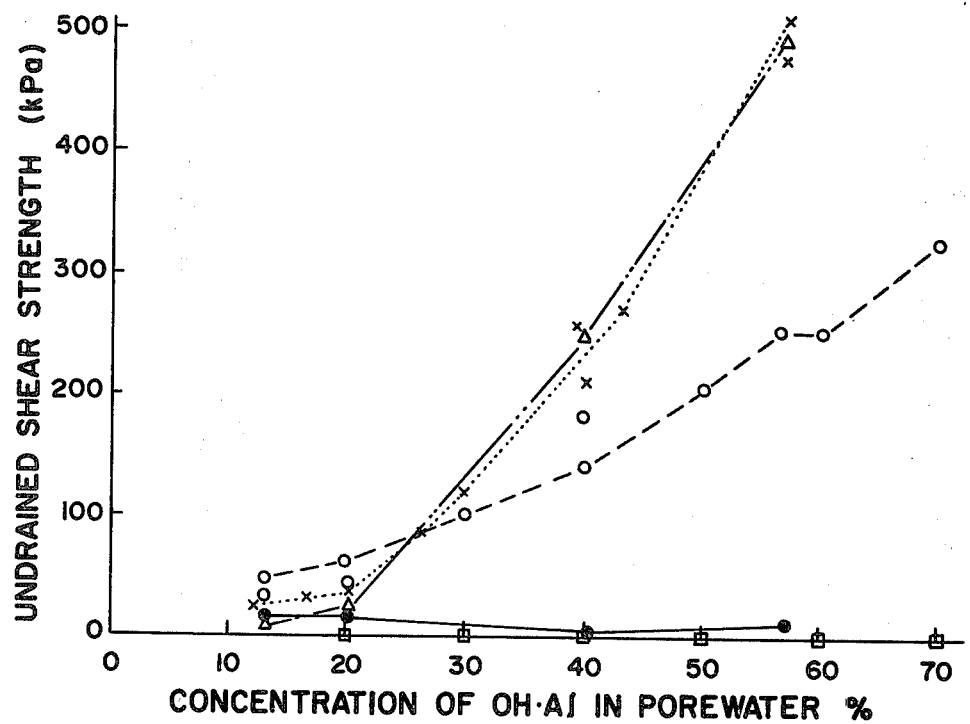
FIG_1
FIG_2

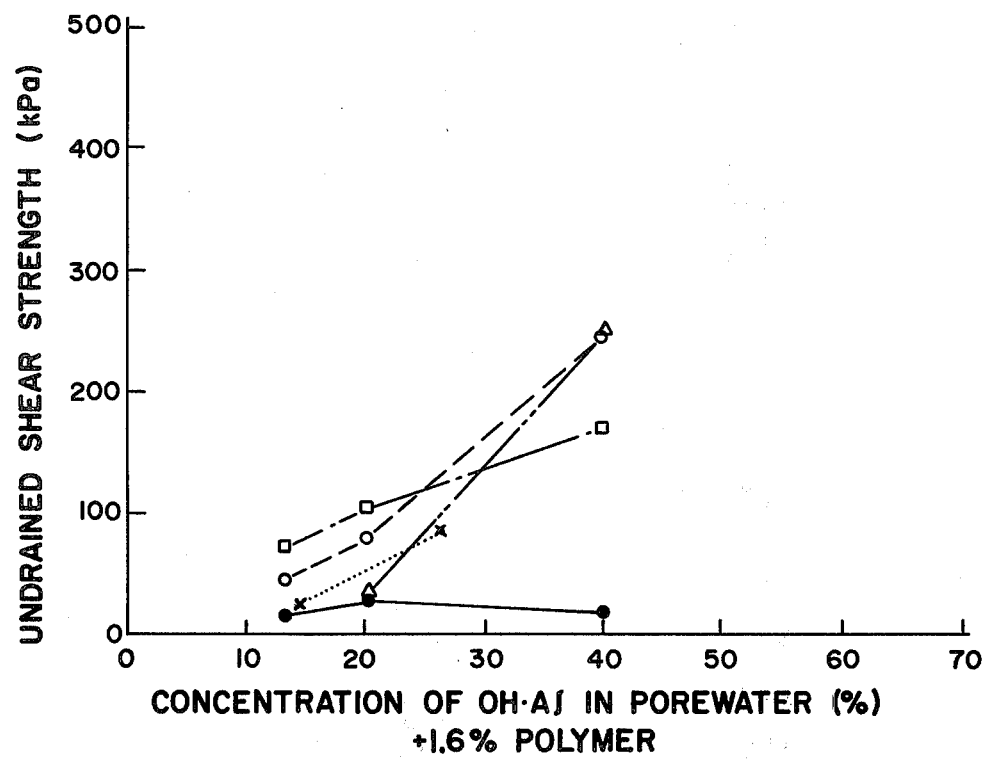
FIG _ 3

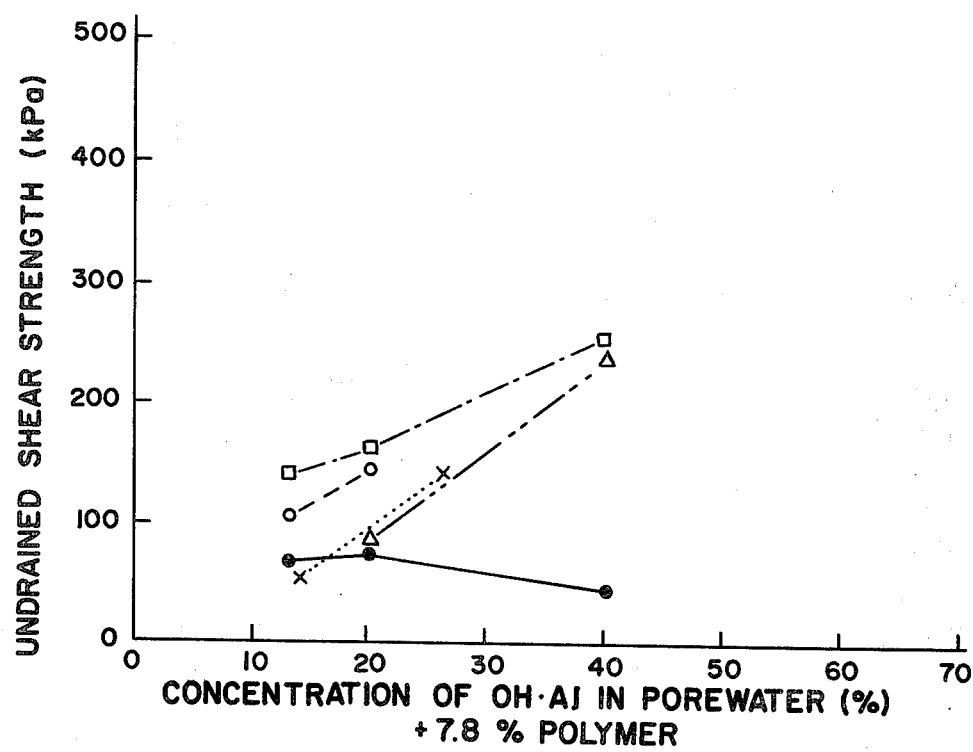
FIG_4
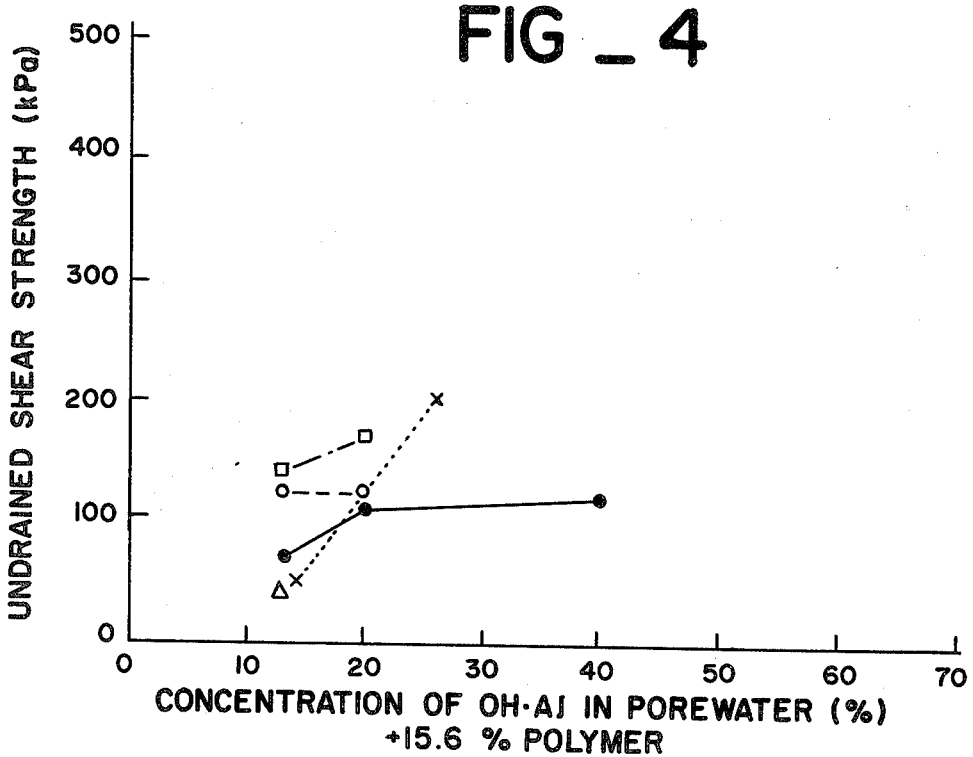
FIG_5

STABILIZING CLAY SOIL WITH HYDROXY-ALUMINUM AND CELLULOSIC POLYMERS

RELATED APPLICATIONS

This application is related to U.S. applications Ser. No. 281,799, U.S. Pat. No. 4,372,786 by MARION G. REED et al; Ser. No. 281,750, U.S. Pat. No. 4,377,419 by MARION G. REED; Ser. No. 281,751, U.S. Pat. No. 4,380,408 by TOR LOKEN et al; and Ser. No. 281,752 U.S. Pat. No. 4,360,599 by TOR LOKEN et al; all filed on July 9, 1981 all assigned to the assignee of this invention. Other applications related to this application are Ser. No. 438,235 and Ser. No. 438,545, filed concurrently herewith and also assigned to said assignee. The disclosures of these applications are incorporated herein by reference.

BACKGROUND OF THE INVENTION

Many clay deposits often need to be stabilized before they can carry any additional load such as is applied during construction activities. This is specially true for the so-called quick clays which frequently are found, for example, in northern Soviet Union, Scandinavia, Canada, upper New York State, and New Zealand. Clays were originally deposited in marine and brackish water in a short period after the last glaciation, and later during the continental (isostatic) uplift were raised above sea level. However, only certain of these clay deposits were subsequently changed into sensitive quick clays. Two processes are mainly responsible for such a change. The original pore water salt content of the clay may have been leached by percolating ground water, or organic matter from logs or marshes which will act as dispersing agents may have been introduced into the clay. The first process has been most important in clays found in Norway, while quick clays containing high organic content formed by the second process are frequently found in Sweden and Canada.

The quick clays will in the undisturbed state exhibit a certain limited strength, but will upon remoulding completely liquefy. This same phenomena has caused several quick clay slides in the lowlands of eastern and middle Norway, often with catastrophic consequences. Heretofore, several chemical stabilization schemes have been tried for such clays. Among them were aluminum chloride ($AlCl_3$) and potassium chloride (KCl). The quick clays have been stabilized in two ways. The clay can be mixed and remoulded with the chemicals, or the chemicals can be allowed to diffuse into the undisturbed quick clay. The disadvantage of the salt diffusion method is the long time it takes to reach the required penetration. The diffusion method has been applied only once, so far as is known, in full scale in the field, when salt wells containing KCl were installed two years prior to a major highway construction.

Heretofore, a method for deep stabilization with unslacked lime (CaO) was developed. Lime is an old stabilizing agent that has been used occasionally. In China it was used centuries ago as a construction material. In the U.S.A. in the 1940's and Europe in the 1950's lime was used as a surface stabilizing agent. The deep stabilization method involves mixing and molding the lime with the clay to form a series of piles which extend down into the clay. These piles provide lateral stabilization to the clay deposit.

Both the lime and potassium chloride methods have some disadvantages. KCl will stabilize the undisturbed circumjacent clay, but not the disturbed clay. Furthermore, CaO makes an unhomogenous stabilization. Pockets of lime cause brittle cylinders with small sideways shear strength. In addition, CaO is not useful on clays with high water content. While hydroxy-aluminum as $Al(OH)_{2.5}Cl_{0.5}$ has not been used as a clay stabilizing agent in foundation engineering before it has been applied as a cementing agent in preparing desired clay microstructures for laboratory studies. Hydroxy-aluminum solution containing KCl has also been used in wells to treat water sensitive clay containing formations and to provide sand stabilization. Relatively dilute solutions and overflushes are commonly used in the field. These methods are disclosed in U.S. Pat. No. 3,603,399 issued Sept. 7, 1971 and No. 3,827,495 issued Aug. 6, 1974 both to Marion G. Reed as assignor to Chevron Research Company.

The above-cited Related Applications provide for stabilizing clay soil by admixing an effective amount of hydroxy-aluminum and in some cases additional chemicals such as potassium chloride with the clay. While potassium chloride is preferred, other chemicals useful in place of potassium chloride include potassium nitrate, potassium sulfate, ammonium chloride, ammonium nitrate and ammonium sulfate. The admixture is preferably done in a manner so that the stabilized clay forms a series of piles which extend into the clay deposit at spaced apart location to provide stability for the entire clay containing deposit. The desired size, location and number of the piles are determined. An effective amount of hydroxy-aluminum is admixed with the clay in place in each location in the deposit to react with the clay and thereby form the desired piles.

It has been found that the addition of other material can improve the method described above.

BRIEF DESCRIPTION OF THE PREFERRED EMBODIMENT OF THE INVENTION

The present invention provides a method of stabilizing clay soil having a high water content by mixing, with the clay soil, hydroxy-aluminum having an effective amount of cellulosic polymer to deactivate water and thereby assist in preventing such water from fluidizing the clay soil. The cellulosic polymer may be nonionic or ionic. Hydroxymethyl cellulose and hydroxyethyl cellulose are particularly useful in accordance with the invention. Carboxymethyl cellulose is the preferred polymer for use with hydroxy-aluminum for stabilizing quick clay having a high water content.

OBJECTS OF THE INVENTION

It is a particular object of the present invention to provide a method of stabilizing quick clay containing soil deposit having a high water content by admixing with the quick clay a dry mixture preferably containing hydroxy-aluminum and an effective amount of cellulosic polymer to react with the clay. Additional objects and advantages of the present invention will become apparent from reading the following detailed description in view of the accompanying drawings.

BRIEF DESCRIPTION OF THE DRAWINGS

FIG. 1 is a legend illustrating and detailing various clays used in demonstrations of the present invention; and FIGS. 2–5 are graphs showing plots of demonstrations conducted in accordance with the present invention. The drawings are incorporated herein and made a part of this specification.

DETAILED DESCRIPTION OF THE INVENTION

The present invention is directed to stabilizing clay soil by admixing with at least portions of such soil an effective amount of a dry mixture of chemicals including hydroxy-aluminum and a cellulosic polymer. The cellulosic polymer may desirably be selected from the group consisting of hydroxymethyl cellulose and hydroxyethyl cellulose. Carboxymethyl cellulose is a preferred polymer useful in accordance with the present invention for mixture with the hydroxy-aluminum.

In preferred form a plurality of pile-like deposits are formed in situ in the clay soil deposit by admixing with wet clay a dry mixture containing at least 5% by weight of hydroxy-aluminum and 1% by weight of carboxymethyl cellulose of the pore water contained in the clay soil. Best results appear to be obtained when the dry mixture chemicals contain between 5% by weight to 70% by weight of dry hydroxy-aluminum and between 1% by weight and 20% by weight of carboxymethyl cellulose of the pore water contained in the clay. For different clays the optimum concentration of hydroxy-aluminum and polymer may, of course, vary. Optimum concentration for a given clay may be determined by simple laboratory tests as herein described.

Hydroxy-aluminum, useful in accordance with the present invention, has a hydroxyl to aluminum ratio of at least 2.0. At low pressure, hydroxyl to aluminum ratios of less than 2.2 tend to be so acidic that carbonates contained in the clay soil turn to carbon dioxide which causes bubbles that are undesired in the present invention. Therefore, in carbonate containing soils it is preferred to use hydroxy-aluminium having a hydroxyl to aluminum ratio of 2.5.

Thus, hydroxy-aluminum, useful in the present invention, has the general formula $Al(OH)_nX_{3-n}$ wherein n has a value of at least 2.0 and preferably 2.5 to 2.7 and x is an anion selected from the group consisting of chloride, bromide, iodide, nitrate, sulfate and acetate. For example, dry hydroxy-aluminum chloride having a formula of $Al(OH)_{2.5}Cl_{0.5}$ has been used successfully in laboratory demonstrations of the present invention. Hydroxy-aluminum is a commercially available chemical and can be obtained for example from Reheis Chemical Company of Berkeley Heights, N.J. or Hoechst Aktiengesellschaft, Frankfurt am Main, West Germany.

"Dry" hydroxy-aluminum refers to the dry chemical with no bulk water added. Dry hydroxy-aluminium has, of course, a substantial amount of chemically bound water. One Reheis product contains, for example, about 20½ weight percent chemically bound water.

FIG. 1 is a legend showing five quick clays which were used in demonstrations conducted in accordance with the present invention. All but the St. Leon are quick clays found in Scandinavia. The St. Leon is a Canadian quick clay. The water content in weight percent of dry soil and the salt content of the clays, when known, are shown in the legend. Also shown are the inorganic carbon and the grain size distribution in terms of weight percent sand, silt and clay.

FIG. 2 shows the results of demonstrations of the effect of hydroxy-aluminum on the clays. Specifically, FIG. 2 shows the relationship between the undrained shear strength (kPa) of the clays and the concentration of hydroxy-aluminum in weight percent of the pore water in the clay mixed with the clay. The Emmerstad, Torrekulla and Ellingsrud clays showed relatively good strength at relatively high concentrations of hydroxy-aluminum. However, even at high concentrations of hydroxy-aluminum, the St. Leon and Hönefoss clays did not exhibit an increase in shear strength. The present invention provides for improving the shear strength of the clays.

FIGS. 3–5 show results of demonstrations conducted with the clays and hydroxy-aluminum combined with a cellulosic polymer. Specifically, FIGS. 3–5 show results in terms of shear strength of the various clays when mixed with hydroxy-aluminum and three different amounts of a carboxymethyl cellulose sold under the brand "TYLOSE". This carboxymethyl cellulose may be obtained from the Hoechst Aktiengesellschaft in Frankfurt, Germany.

The addition of the polymer to the hydroxy-aluminum, as is evident from an inspection of FIGS. 3–5, is effective in improving the shear strength of the clays treated by the mixture. The improvement is of particular note in the case of the Hönefoss and St. Leon clays which were not affected by hydroxy-aluminum alone.

In accordance with the present invention, samples of the clay which is to be stabilized are admixed with various mixtures and amounts of hydroxy-aluminum and polymer to select the optimum mixture for the particular clay. After the effective mixture and amount of the chemicals is established they are mixed with the quick clay to be stabilized.

From the above description it is evident that the present invention provides a method of stabilizing quick clay by admixing dry hydroxy-aluminum and cellulosic polymer with the clay. Although only specific embodiments of the present invention have been described in detail, the invention is not limited thereto but is meant to include all embodiments coming within the scope of the appended claims.

What is claimed is:

1. In a method of stabilizing quick clay soil having a high water content by mixing an effective amount of dry hydroxy-aluminum with the quick clay soil, the improvement comprising adding to the hydroxy-aluminum an effective amount of cellulosic polymer to deactivate water and thereby assist in preventing such water from fluidizing the quick clay soil.

2. The method of claim 1 further characterized in that the cellulosic polymer is selected from the group consisting of hydroxymethyl cellulose and hydroxyethyl cellulose.

3. The method of claim 1 where the amount of hydroxy-aluminum mixed with the clay is at least 5% by weight and the amount of the cellulosic polymer is at least 1% by weight of the pore water contained in said clay.

4. The method of claim 1 further characterized in that the polymer is a carboxylated cellulosic polymer.

5. The method of claim 1 further characterized in that the polymer is carboxymethyl cellulose polymer.

6. The method of claim 5 where the amount of hydroxy-aluminum mixed with the clay is between about 5% by weight and 70% by weight and amount of carboxymethyl cellulose is between about 1% by weight and 20% by weight of the pore water contained in said clay.

7. The method of claim 1 where the amount of hydroxy-aluminum mixed with the clay is between about 10% by weight and 40% by weight and the amount of carboxymethyl cellulose is between about 5% by weight and 16% by weight.

* * * * *

UNITED STATES PATENT AND TRADEMARK OFFICE
CERTIFICATE OF CORRECTION

PATENT NO. : 4,425,165
DATED : January 10, 1984
INVENTOR(S) : Odd R. Bryhn & Tor Loken It is certified that error appears in the above-identified patent and that said Letters Patent are hereby corrected as shown below:

Claim 7, Col. 4, line 63, "claim 1" should read --claim 5--.

Signed and Sealed this

Fifteenth Day of January 1985

[SEAL]

Attest:

GERALD J. MOSSINGHOFF

Attesting Officer

Commissioner of Patents and Trademarks